United States Patent [19]
Mandrona et al.

[11] 3,719,075
[45] March 6, 1973

[54] VISCOSITY MEASURING DEVICE

[75] Inventors: Nicholas Mandrona, Stratford; Warren R. Jewett, Orange, both of Conn.

[73] Assignee: Medical Sciences International, Inc., Milford, Conn.

[22] Filed: Oct. 19, 1970

[21] Appl. No.: 81,844

[52] U.S. Cl..........................73/54, 73/17 R, 73/64.1
[51] Int. Cl..............................................G01n 11/10
[58] Field of Search..................73/54, 59, 64.1, 17 R

[56] References Cited

UNITED STATES PATENTS

| | | | |
|---|---|---|---|
| 2,629,790 | 2/1953 | Laing et al. | 73/59 X |
| 1,960,225 | 5/1934 | Schoenberg | 73/59 |
| 3,053,078 | 9/1962 | Jewett | 73/54 |
| 3,498,104 | 3/1970 | Van Kerkvoort et al. | 73/17 R |

FOREIGN PATENTS OR APPLICATIONS

| | | | |
|---|---|---|---|
| 837,692 | 6/1950 | Great Britain | 73/59 |
| 6,501,270 | 2/1967 | Netherlands | 73/64.1 |

*Primary Examiner*—Louis R. Prince
*Assistant Examiner*—Joseph W. Roskos
*Attorney*—Delio & Montgomery

[57] ABSTRACT

This disclosure relates to apparatus for measuring the viscosity and change in viscosity of fluids, such as blood. A member carrying a container of a fluid sample is reciprocated while a pendulum extends therein. When the viscosity of the fluid changes sufficiently, motion is imparted to the pendulum and predetermined motion thereof is detected to indicate a given viscosity of the fluid.

12 Claims, 7 Drawing Figures

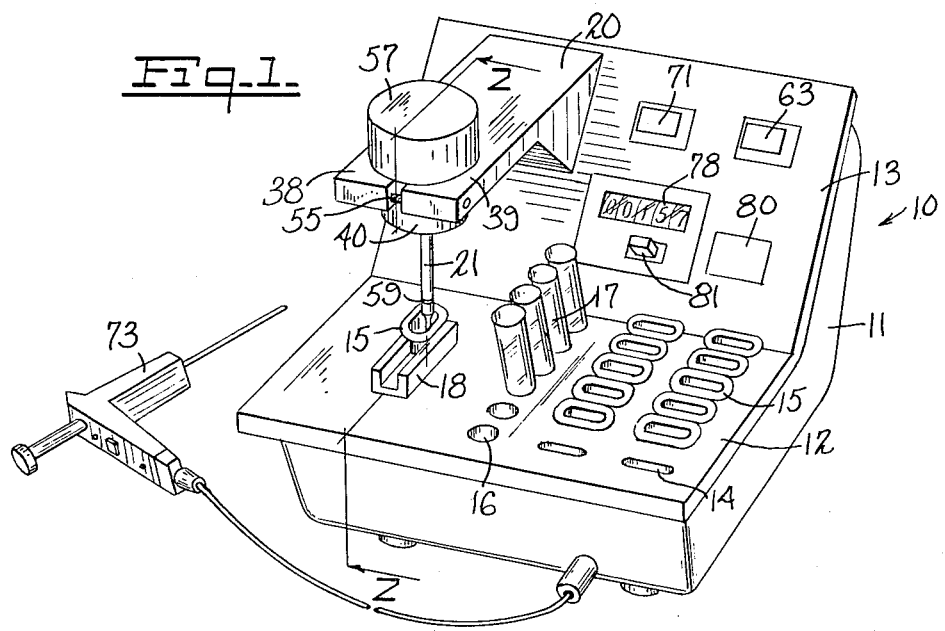
Fig. 1.
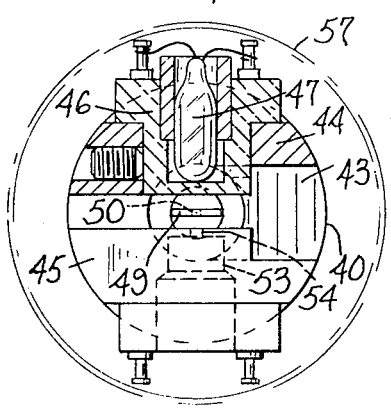
Fig. 3.
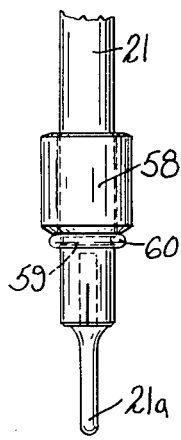
Fig. 6.
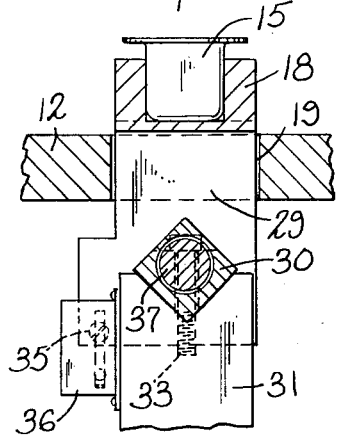
Fig. 5.
Fig. 4.
INVENTORS
Nicholas Mandrona
Warren R. Jewett
BY Dedio and Montgomery
ATTORNEYS

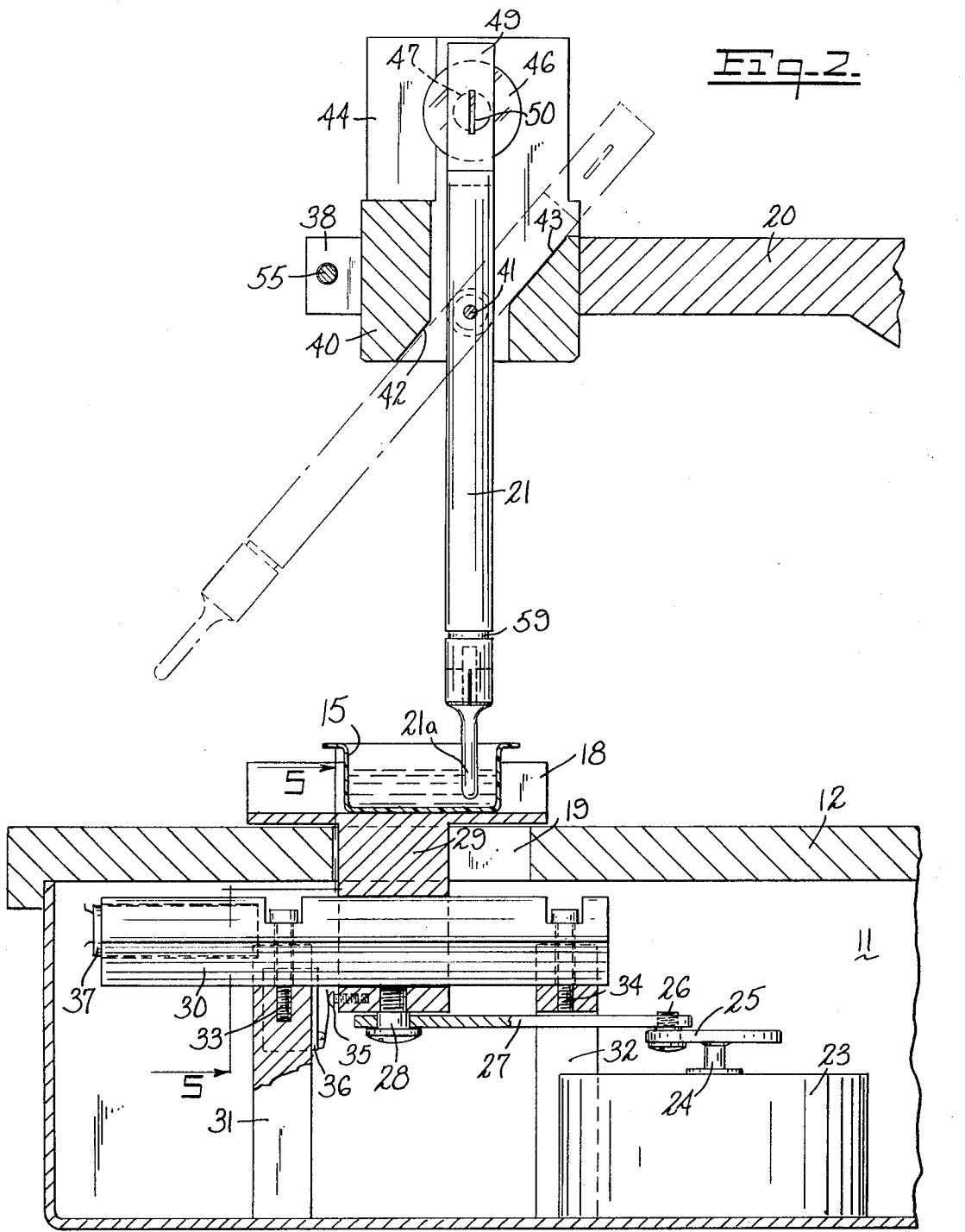

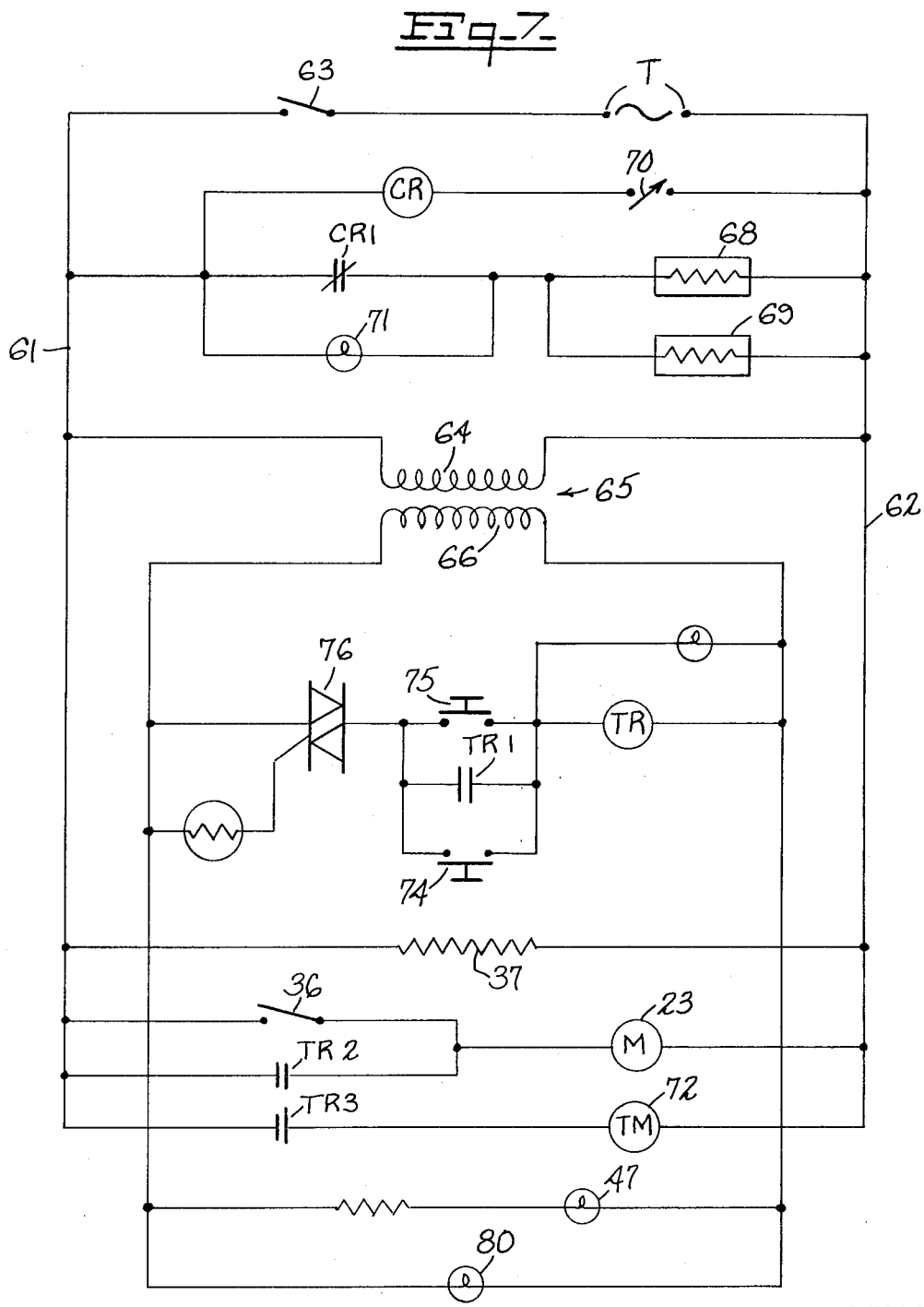

VISCOSITY MEASURING DEVICE

This invention relates to an improved apparatus for testing fluids and more particularly relates to apparatus for measuring changes in the characteristics, particularly the viscosity of the fluids. This invention is particularly useful in testing the coagulation time of whole blood and the clotting activity of plasma factors - prothrombin, partial thromboplastin times, etc.

Techniques presently used in determining changes in characteristics of fluid for biological purposes are not precise and may depend to a great extent upon the skill and experience of a technician. For example, in the most frequently used whole blood clotting time, the Lee White technique, venous blood is drawn with a syringe and the time is noted. Two ml. of blood is placed in each of three test tubes which are then put into a water bath at 37° C. After two minutes, test tube No. 1 is gently tilted every 30 seconds until coagulation occurs and the time of this occurrence must again be noted. After coagulation has occurred in tube No. 1, the procedure is repeated with tube No. 2 and tube No. 3. The coagulation time for the purpose of this test is considered to be the interval from the venepuncture to the average coagulation of times in tubes No. 2 and 3. Normal clotting time is between 6 and 12 minutes. It will be readily apparent that many variations and conditions may occur with varying results, such as errors in noting and recording the time, the force and the intervals of tilting the tubes, the difficulty in decision of the precise moment of coagulation. A typical prothrombin activity test presents similar difficulties. For example, 4-½ cc. of blood are drawn and placed in a test tube with ½ cc. of an anti-coagulant, such as sodium citrate, or oxylate. The blood in the tube is then centrifuged and the resulting plasma may be either tested immediately or stored under refrigeration for future tests. In conducting the tests, a clean test tube is placed in a water bath at 37°C. Then 0.1 cc. of clear plasma is placed in the tube and a platinum wire loop is inserted and briskly agitated as 0.2 cc. of the reagent is pipetted into the same tube. The mixing with the wire loop continues until clotting occurs. The time from the beginning of the mixing until clotting occurs must be noted. Normal range is 11–13 seconds. It will be apparent that variations in the results may be obtained at different rates of agitation and with different proportions of plasma and reagent. In addition, the operator must simultaneously perform several observations and operations with a resultant possibility or probability that errors or variations may occur.

The mechanical timing apparatus as disclosed in U. S. Pat. No. 3,053,078 may also be used in making the above-mentioned tests. This apparatus has significantly reduced the time involved in the tests and enhanced the accuracy thereof. This patent discloses a device wherein the characteristics of fluid are measured by rotating a specimen with a mass therein and deriving an indication when the mass is caused to rotate a predetermined distance by the rotating fluid. This provides a substantial improvement over the aforementioned techniques and provides a very useful tool for measuring clotting time and viscosity. However, the use of the rotating mass provides a limitation on the sensitivity. Additionally, a criticality is present in the adjustment of the shutoff point due to the dependency upon the rotary motion of a magnet, and some time loss may be experienced during shutoff.

Accordingly, the present invention is intended to provide a more sensitive device which is more accurate in its adjustment of the shutoff point and in which timing means are very precisely accurate to the shutoff point to furnish an exact measurement of the clotting time.

Apparatus embodying the invention is so constructed that it may be used with great facility by a non-skilled operator to precisely determine the time required for the fluid to reach a given viscosity and, therefore, the clotting time of blood samples.

Briefly stated, the invention in one form thereof comprises the use of a free-hanging pendulum type device in which the arc of movement determines sensing time. The pendulum extends into a container which is mounted upon a reciprocating platform in the plane of motion of the pendulum. A sample together with a reagent may be placed in the cup and the platform reciprocated. A timing cycle is initiated when the sample and reagent are placed in the container and reciprocation of the platform commenced. The pendulum has an extended portion above its pivot point with an aperture therein through which light passes when the pendulum is in a static position. The light passing therethrough is incident upon a photocell. As the cup containing the sample is reciprocated with the tip of the pendulum hanging within the fluid, the pendulum will begin to swing as the viscosity of the sample increases. When the beam of light is interrupted by swinging of the pendulum, the timing cycle is interrupted to provide an indication of the time that it takes for the sample to reach a predetermined viscosity. This may then be compared against known standards to indicate the clotting time of the sample.

An object of this invention is to provide new and improved apparatus for testing biological and other fluids.

Another object of this invention is to provide a device of the type described which utilizes only linear motion.

Another object of this invention is to provide a new and improved device of the type described which will precisely time the clotting time of liquids.

A further object of this invention is to provide a new and improved device of the type described which is flexible in operation and provides rapid usage to enable a greater number of samples to be tested in a given amount of time.

The features of the invention which are believed to be novel are particularly pointed out and distinctly claimed in the concluding portion of the specification.

However, the invention both as to its organization and operation, together with further objects and advantages thereof, may best be appreciated by reference to the following detailed description taken in conjunction with the drawings, in which:

FIG. 1 is a perspective view of an apparatus embodying the invention;

FIG. 2 is an enlarged view in section seen in the plane of lines 2—2 of FIG. 1;

FIG. 3 is a view partially in section seen looking down on the device of FIG. 2;

FIG. 4 is an elevational view partly in section of the device of FIG. 3;

FIG. 5 is a view seen in the plane of lines 5—5 of FIG. 2;

FIG. 6 is a view showing the lower portion of the pendulum-like device of FIG. 2, and FIG. 7 is a schematic diagram of the control network of the apparatus of FIGS. 1 – 6.

An apparatus 10 embodying the invention generally comprises a housing member 11 having a horizontal cover plate 12 and back plate 13. Plate 12 has apertures 14 therein adapted to receive and store sample receptacles 15 and may also have apertures 16 therein adapted to receive and store test tubes or similar devices 17. A sample carrier 18 extends through a slot 19 (FIG. 2) defined in plate 12 and is adapted to receive a sample container 15 therein. A support member 20 extends from upright back plate 13 and provides a mounting for a pendulum 21, as is hereinafter described.

Mounted within housing 11 is a motor 23 having a rotatable shaft 24 receiving thereon crank 25. Connected to crank 25 as by means of a screw or bolt 26 is a rod 27 which is, in turn, pivotally connected as by means of a screw 28 to a depending extension 29 of carrier 18. Portion 29 is received on a guide 30 of rectangular cross section which is supported on upright members 31 and 32. In operation, when motor 23 is energized, crank 25 which may be in the form of a disc is rotated. This, in turn, operates rod 27 which reciprocates carrier 18 along guide 30 which moves the container 15 carried thereon therewith.

The guide member 30 is secured to the spaced apart supports 31 and 32 as by means of bolts 33 and 34.

As shown in FIG. 2, portion 29 of carrier 18 has a set screw 35 thereon adapted to operate a microswitch 36 for purposes hereinafter described. A heating element 37 is carried in a bore provided therefor in guide 30. The heating element 37 will serve to heat the carrier 18 to a predetermined temperature through the guide 30.

The support 20 has spaced apart arms 38 and 39 which carry a housing or support member 40 in which is pivotally mounted the pendulum 21 about a pin 41 (FIG. 4). Member 40 is provided with inclined surfaces 42 and 43 to allow the pendulum to be swung out to the position shown in dotted line in FIG. 2 to permit placement and removal of a container 15 in carrier 18. Carried in an opening in an upright arm 44 of member 40 is a mounting member 46 (FIGS. 3 and 4) for a lamp 47. Member 46 is made of transparent material. A member 49 having a slot 50 defined therein extends from the top of pendulum 21. Mounted in another arm 45 of member 40 on the side of member 49 opposite lamp 47 is a member 52 carrying a photosensitive element 53, such as a photo resistor, therein. An aperture 54 is defined in member 52 to permit passage of light to element 53. Light from lamp 47 is normally incident upon the photo element 53 through the aperture or slit 50 in member 49. It will be apparent that if pendulum 21 is swung a sufficient distance, the member 49 will interrupt incidence of light on photo element 53. This will interrupt the timing cycle as hereinafter described.

Member 40 is received in an opening provided therefor in support 20 and held therein as by means of a bolt 55 which tends to compress arms 38 and 39 of member 20. A cap or cover member 57 is disposed about the upper portion of member 40 to prevent ambient light from affecting photo element 53.

The control network for the apparatus is shown in FIG. 7. AC power is applied to terminals T to which are connected bus lines 61 and 62. When OFF-ON switch 63 is closed, power is applied to primary 64 of a transformer 65 and voltage is induced in the secondary 66 thereof. Simultaneously therewith, power is applied to a heater circuit exemplified as resistors 68 and 69. The heating resistors are disposed beneath plate 12 and bring the temperature thereof up to a predetermined temperature which by way of example may be selected to be 37° C. When this temperature is reached, a thermostatic switch 70 is closed and a relay CR is energized which opens its normally closed contacts CR–1 to interrupt heating current to the elements 68 and 69. However, an indicator lamp 71 connected across contact CR–1 will light indicating that surface 12 is up to rated temperature. A small amount of current will be drawn through the resistors 68 and 69 but the voltage drop across this branch will be essentially all across lamp 71. If the temperature should now fall, thermostatic switch 70 will close and heating current will again flow through heating elements 68 and 69. The carrier heating element 37 is also connected across lines 61 and 62 as is motor 23, and a timing motor 72.

When the surface plate 12 is brought up to temperature, indicator light 71 will so indicate. At this time, the blood or plasma sample is inserted into one of the containers 15 with the pendulum suspended in the specimen. The container has slightly resilient walls and is frictionally received in carrier 18. A reagent may then be added in any preferred fashion and the timing cycle stopped. If desired, a switch operated pipette 73 as shown in FIG. 1 may close a switch 74 when all of the reagent has been ejected therefrom. Alternatively, a start switch 75 may be closed. When either switch 74 or 75 is closed, relay TR will be energized if triac 76 is conductive. Triac 76 is a bi-directional silicon controlled rectifier having its gate electrode connected to photo resistor 53. If light is incident on photo-resistor 53 from lamp 47, a voltage drop will be produced thereacross and a triac 76 will fire. At this time, relay TR is energized and picks up its contact TR–1 to latch itself in. Simultaneously therewith lamp 77 is illuminated to indicate the start of a timing cycle. Relay TR will also pick up its contacts TR–2 and TR–3. When contact TR–2 is closed, motor 23 is energized to commence reciprocating carrier 18. When contact TR–3 is energized, a timing motor 72 is energized to commence a timing cycle.

The mixing motor 23 and timing motor 72 will remain operating so long as the light from lamp 47 is allowed to pass through slot 50 and be incident upon the photo element 53. However, upon clotting, as the sample becomes more viscous, the pendulum will move with the container 15 and carrier 18 and block the light passing aperture 48. The resistance of the photo element will increase, decreasing the control voltage to triac 76. The triac will then switch to its OFF state interrupting current through relay TR. When the contacts of relay TR–1 open, the timer motor 72 stops immediately. However, the mixing motor will continue to run until switch 36 is opened.

The timer motor 72 drives a gear train arrangement which may provide a digital readout on the indicator 78 on plate 13. Such gear train may drive drums with figures thereon in a well-known manner to indicate the duration of the timing cycle.

The motor 23 will continue to run after the timing cycle until the portion 29 of carrier 18 is in the position as shown in FIG. 2, so that switch 36 is opened to stop the motor in this position. This insures that the carrier 18 will be stopped in the forward position to allow the pendulum to be swung outwardly as shown in the dotted line in FIG. 2 to permit easy removal of the container 15 and insertion of a new container.

A power ON indicator light 80 may be provided on backplate 13. A reset button 81 is provided to reset time indicator 78.

The pendulum 21 may be calibrated for various applications by the addition or removal of weights therefrom in accordance with various fluids to be tested. As shown in FIG. 6, a weight 58 may be received on pendulum 21 and supported just above a groove 59 by an O-ring received in the groove.

By changing the weights 58, the force necessary to commence movement of the pendulum is changed.

It will be understood that the apparatus can be standardized by timing the operation against standard blood samples of known coagulation or clotting time, the tip 21a of the pendulum to be arranged in configuration and size so as to obtain a clotting time operation comparable to the time obtained in presently used clotting time tests. In this respect, the weights 58 may also be utilized. By varying the configuration in size of the pendulum tip 21a and using the weight 58, the length of the cycle of operation can be decreased or increased.

In the case of prothrombin activity tests, the container may receive approximately 0.1 cc. of plasma and 0.2 cc. of reagent pipetted into the container and then switch 63 is closed. Then either through switch 75 or pipette switch 74, the mixing motor and timing motor are energized. Initially the reciprocation of the container and plasma will not cause movement of the pendulum. However, when clotting occurs, the pendulum is caused to swing until the light passing through slot 50 is interrupted. When such movement of pendulum 21 occurs, the triac 76 will become nonconductive, relay TR will drop out opening its contacts TR-2 and TR-3. This will interrupt timing motor 72 and subsequently motor 23 will be de-energized when it moves to a position to open switch 36. The timing indicator 78 will then show the time for completing the test.

It will thus be seen that the objects of the invention are efficiently attained. While a preferred embodiment of the invention has been set forth for purposes of disclosure, modifications to the disclosed embodiment of the invention as well as other embodiments thereof may occur to those skilled in the art. Accordingly, it is intended to include in the scope of the appended claims all embodiments and modifications of the invention which do not depart from the spirit and scope of the invention.

What is claimed is:

1. Apparatus for use in testing biological and other fluids to determine characteristics such as viscosity, comprising, a linearly reciprocal carrier adapted to receive a container for a fluid sample, means for reciprocating said carrier, a pendulum, means pivotally mounting said pendulum above said carrier, said pendulum arranged to extend into a sample in a container on said carrier, and means for sensing predetermined movement of said pendulum in a sample as said carrier is reciprocated, said support member being constructed and arranged to permit pivotal motion in at least one direction to allow the tip of said pendulum to be moved into and out of a container on said carrier.

2. Apparatus for use in testing biological and other fluids to determine characteristics such as viscosity, comprising, a linearly reciprocal carrier adapted to receive a container for a fluid sample, means for reciprocating said carrier, a pendulum pivotally mounted above said carrier and arranged to extend into a sample in a container on said carrier, means for sensing predetermined movement of said pendulum in a sample as said carrier is reciprocated, a housing member having a top wall, a slot defined in said top wall, said carrier member having a portion extending into said housing through said slot, and a linear guide member in said housing, said carrier portion being guidably mounted to said guide member.

3. The apparatus of claim 2 further including means for heating said carrier member to a predetermined temperature.

4. The apparatus of claim 3 wherein said heating means is carried by said guide.

5. The apparatus of claim 3 further including a housing member having a top wall, a plurality of apertures in said top wall for receiving sample containers therein, and means for heating said top wall to a predetermined temperature to preheat the sample containers.

6. Apparatus for use in testing biological and other fluids to determine characteristics such as viscosity, comprising, a linearly reciprocal carrier adapted to receive a container for a fluid sample, means for reciprocating said carrier, a pendulum pivotally mounted above said carrier and arranged to extend into a sample in a container on said carrier, means for sensing predetermined movement of said pendulum in a sample as said carrier is reciprocated, said means for sensing movement comprising means extending above the pivot point of said pendulum and having a slot therein, and a lamp and photo-sensitive element disposed on either side of said extending means such that light normally passes through the slot and is incident on said photosensitive element, said extending portion being effective to interrupt incidence of light on said photosensitive element upon predetermined movement of said pendulum.

7. Apparatus for use in testing biological and other fluids to determine characteristics such as viscosity, comprising, a linearly reciprocal carrier adapted to receive a container for a fluid sample, means for reciprocating said carrier, a pendulum pivotally mounted above said carrier and arranged to extend into a sample in a container on said carrier, means for sensing predetermined movement of said pendulum in a sample as said carrier is reciprocated and means for measuring the time between initiation of reciprocation of said carrier and predetermined movement of said pendulum.

8. The apparatus of claim 7 wherein said means for reciprocating said carrier member is an electric motor, said means for measuring the time includes an electric timing motor, and means for energizing said motors simultaneously.

9. The apparatus of claim 8 further including means responsive to predetermined movement of said pendulum for interrupting energization of said timing motor.

10. The apparatus of claim 8 further including circuit means for providing energy to said motor subsequent to predetermined movement of said pendulum until said carrier member is in a predetermined position.

11. Apparatus for use in testing biological and other fluids to determine characteristics such as viscosity, comprising, a linearly reciprocal carrier adapted to receive a container for a fluid sample, means for reciprocating said carrier, a pendulum pivotally mounted above said carrier and arranged to extend into a sample in a container on said carrier, means for sensing predetermined movement of said pendulum in a sample as said carrier is reciprocated and a motor for reciprocating said carrier, first and second circuits for energizing said motor, said first and second circuits being effective to energize said motor during reciprocating operation of said carrier, said first circuit being open when said carrier is in a predetermined position and otherwise closed, whereby when said second circuit is opened said carrier will continue to reciprocate until it reaches said predetermined position.

12. The apparatus of claim 11 wherein said first circuit includes a normally closed switch which is engaged and opened by said carrier member at said predetermined position.

* * * * *